(12) United States Patent
Muramatsu

(10) Patent No.: US 8,629,912 B2
(45) Date of Patent: Jan. 14, 2014

(54) CAMERA INCLUDING A PLURALITY OF IMAGE SENSORS

(75) Inventor: Keiko Muramatsu, Tachikawa (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/920,118

(22) PCT Filed: May 9, 2006

(86) PCT No.: PCT/JP2006/309308
§ 371 (c)(1),
(2), (4) Date: Nov. 9, 2007

(87) PCT Pub. No.: WO2006/121037
PCT Pub. Date: Nov. 16, 2006

(65) Prior Publication Data
US 2009/0102936 A1     Apr. 23, 2009

(30) Foreign Application Priority Data

May 12, 2005   (JP) .................................. 2005-139434

(51) Int. Cl.
   *H04N 5/228*   (2006.01)
(52) U.S. Cl.
   USPC ...................................... 348/222.1; 348/229.1
(58) Field of Classification Search
   USPC .......................................... 348/262, 263, 264
   See application file for complete search history.

(56) References Cited

U.S. PATENT DOCUMENTS

| 5,602,412 A * | 2/1997 | Suzuki et al. ................. 257/432 |
| 5,764,285 A * | 6/1998 | Ochi et al. ................. 348/222.1 |
| 6,888,566 B2 * | 5/2005 | Larkin et al. ............... 348/208.4 |
| 6,940,556 B1 * | 9/2005 | Tamune ........................ 348/350 |
| 2002/0030749 A1 | 3/2002 | Nakamura et al. |
| 2002/0085100 A1 * | 7/2002 | Takahashi ..................... 348/223 |
| 2003/0001958 A1 * | 1/2003 | Hoshuyama ............... 348/223.1 |
| 2003/0160886 A1 | 8/2003 | Misawa et al. |
| 2004/0233295 A1 * | 11/2004 | Hoshuyama ............... 348/222.1 |
| 2004/0246348 A1 * | 12/2004 | Takeshita .................. 348/223.1 |
| 2005/0270398 A1 | 12/2005 | Hibino |
| 2006/0221217 A1 * | 10/2006 | Kubo et al. ................... 348/262 |

FOREIGN PATENT DOCUMENTS

| EP | 1 599 038 A1 | 11/2005 |
| JP | A-11-298792 | 10/1999 |
| JP | A 2001-86382 | 3/2001 |
| JP | A 2001-103508 | 4/2001 |

(Continued)

OTHER PUBLICATIONS

Mar. 23, 2010 Office Action issued in European patent application No. 06 746 139.2.
Summons to Attend Oral Proceedings issued in EP Application No. 06746139.2 on Oct. 21, 2010.
Jun. 29, 2012 Office Action issued in Korean Application No. 10-2007-7026461 (with Translation).
Jun. 19, 2012 Office Action issued in Japanese Application No. 2007-528281 (with Translation).
Office Action issued in Japanese Application No. 2007-528281 dated Mar. 21, 2012 (w/ Translation).
Office Action issued Feb. 27, 2013 in counterpart Korean Patent Application No. 10-2007-7026461 (with translation).

*Primary Examiner* — James Hannett
*Assistant Examiner* — Dwight C Tejano
(74) *Attorney, Agent, or Firm* — Oliff & Berridge, PLC

(57) ABSTRACT

A camera includes: a first image sensor that captures an image of a subject and outputs a first imaging signal; a second image sensor that is separately arranged from the first image sensor, captures an image of the subject and outputs a second imaging signal; a driving unit that drives the first image sensor and the second image sensor; an image processing unit that processes the first imaging signal and the second imaging signal by time sharing; and a control unit that controls the driving unit and the image processing unit.

13 Claims, 8 Drawing Sheets

(56) References Cited

FOREIGN PATENT DOCUMENTS

| JP | A 2001-154114 | 6/2001 |
| JP | A-2002-094862 | 3/2002 |
| JP | A-2003-315664 | 11/2003 |
| JP | A 2004-23452 | 1/2004 |
| JP | A-2004-266362 | 9/2004 |
| JP | A-2006-203346 | 8/2006 |
| WO | WO 2004/073298 A1 | 8/2004 |

* cited by examiner

CAMERA INCLUDING A PLURALITY OF IMAGE SENSORS

TECHNICAL FIELD

The present invention relates to a camera including a plurality of image sensors.

BACKGROUND ART

A camera including an image sensor that acquires an image for photographing and an image sensor that acquires an image for analysis is known (see Patent Document 1).

Patent Document 1: Japanese Laid-open Patent Publication No. 2001-103508.

DISCLOSURE OF THE INVENTION

Problem to be Solved by the Invention

A conventional camera is provided with both a circuit that processes a signal of image captured by a CCD for photography and a circuit that processes a signal of image captured by an image sensor for analysis. This constitutes a limiting factor of downsizing and power saving of a camera.

Means for Solving the Problem

According to the 1st aspect of the present invention, a camera comprises: a first image sensor that captures an image of a subject and outputs a first imaging signal; a second image sensor that is separately arranged from the first image sensor, captures an image of the subject and outputs a second imaging signal; a driving unit that drives the first image sensor and the second image sensor; an image processing unit that processes the first imaging signal and the second imaging signal by time sharing; and a control unit that controls the driving unit and the image processing unit.

According to the 2nd aspect of the present invention, in the camera according to the 1st aspect, it is preferred that the first imaging signal is an imaging signal for recording, and the second imaging signal is an imaging signal for analyzing a photographic field.

According to the 3rd aspect of the present invention, in the camera according to the 2nd aspect, it is preferred that the control unit controls the driving unit to enable either one of the first image sensor and the second image sensor to start capturing an image in response to an operation signal from a shutter release operation member.

According to the 4th aspect of the present invention, in the camera according to the 3rd aspect, it is preferred that the control unit controls the driving unit so that the first image sensor starts capturing an image after the second imaging signal for at least one image is output from the second image sensor that has already started capturing an image.

According to the 5th aspect of the present invention, in the camera according to any one of the 2nd to the 4th aspects, it is preferred that the control unit controls the driving unit and the image processing unit so that the second image sensor starts capturing an image, an analysis of the photographic field is performed by using the second imaging signal output from the second image sensor, exposure is controlled based on information obtained by the analysis to enable the first image sensor to start capturing an image, and processing on the first imaging signal is performed based on information obtained by the analysis.

According to the 6th aspect of the present invention, in the camera according to the 4th aspect, it is preferred that: the first imaging signal is used in the analysis in continuous shooting; and the control unit controls the driving unit to enable the first image sensor to start capturing a next image when the first imaging signal is output from the first image sensor during continuous shooting.

According to the 7th aspect of the present invention, in the camera according to the 6th aspect, it is preferred that the control unit controls the driving unit and the image processing unit so that an analysis of the photographic field is performed by using the first imaging signal output from the first image sensor, the first image sensor starts capturing the next image at a controlled exposure based on information obtained by the analysis, and processing on the first imaging signal is performed based on the information obtained by the analysis.

The above driving unit may be replaced with a driving means.

The above image processing unit may be replaced with an image processing means.

The above control unit may be replaced with a control means.

Advantageous Effect of the Invention

According to the present invention, downsizing and power saving of a camera provided with a plurality of image sensors can be achieved.

BEST MODE FOR CARRYING OUT THE INVENTION

Figure 1:
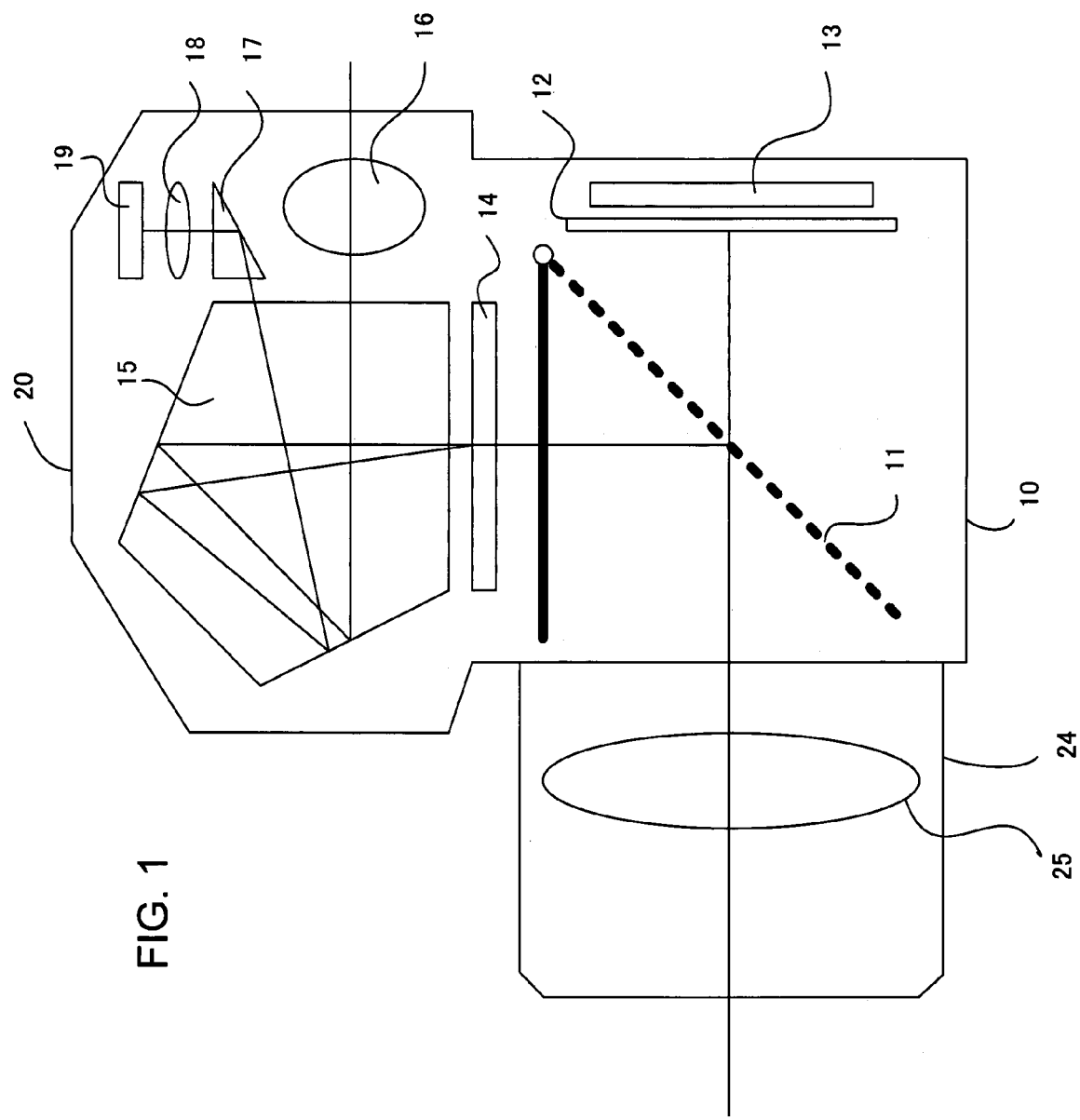
FIG. 1 is a diagram illustrating the construction of essential parts of a single-lens reflex electronic camera.

Hereinafter, a best mode for carrying out the present invention is explained. FIG. 1 is a diagram illustrating the construction of essential parts of a single-lens reflex electronic camera. In FIG. 1, a camera main body 10 is provided with a finder device 20 and an interchangeable lens 24, each of which is capable of being attached/detached to/from the camera main body 10.

Subject light that has entered the camera main body 10 through the interchangeable lens 24 is led upwards by a quick return mirror 11, the mirror 11 being positioned as shown in a broken line before release of a shutter, to form an image onto a finder mat 14. The subject light further enters a pentaprism 15, which guides the subject light that entered therein into an eyepiece lens 16 while the pentaprism 15 guides a part of the subject light into a prism 17. The light that has entered the prism 17 passes through a lens 18 and then enters an auxiliary image sensor 19 to form an image onto an imaging surface thereof. The auxiliary image sensor 19, which is constituted by, for example, a CCD image sensor including a plurality of photoelectric conversion elements, captures an image of the subject image formed on the imaging surface thereof and outputs a photoelectrically converted signal corresponding to the luminance of the subject image.

After release of the shutter, the quick return mirror 11 turns into a position shown in a solid line and the subject light is guided through a shutter 12 into an image sensor for photographing 13 to form an image on an imaging surface thereof. The image sensor for photographing 13, which is constituted by, for example, a CCD image sensor including a plurality of photoelectric conversion elements, captures an image of the subject formed on the imaging surface thereof and outputs a photoelectrically converted signal corresponding to the luminance of the subject image.

The electronic camera of the present embodiment usually uses an imaging signal created by the image sensor for photographing 13 for recording images and an imaging signal created by the auxiliary image sensor 19 for analyzing images. Image analysis processing is performed to obtain a situation of photographic field and includes well-known photometric processing, subject tracking processing, and imaging scene analysis processing.

The number of pixels in the image sensor for photographing 13 is greater than the number of pixels in the auxiliary image sensor 19. The number of pixels in the image sensor for photographing 13 is, for example, several millions or more and the number of pixels of the auxiliary image sensor 19 is, for example, several hundred thousands. The image sensor for photographing 13 and the auxiliary image sensor 19 are provided on respective imaging surfaces thereof with R (red), G (green), and B (blue) color filters in positions corresponding to pixels. The image sensors each capture an image of a subject, so that the imaging signal output from each image sensor has color information each expressed by an RGB color system.

It is to be noted that the position where the auxiliary image sensor 19 is arranged need not be just as shown in FIG. 1 so far as the auxiliary image sensor 19 is in a position conjugate with the image sensor for photographing 13 with respect to the lens 25 in the interchangeable lens 24.

Figure 2:
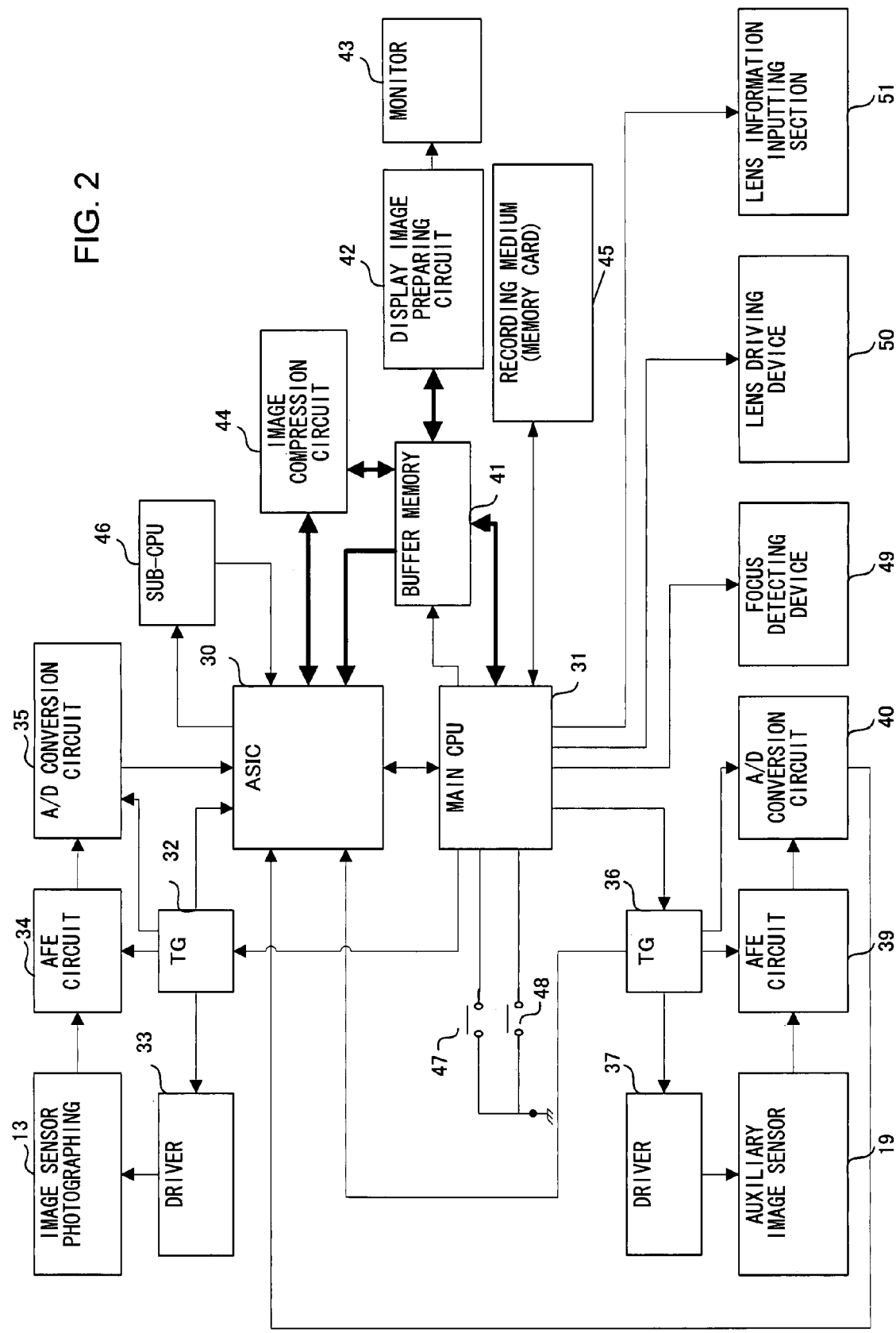
FIG. 2 is a block diagram presenting the circuitry construction of an electronic camera.

FIG. 2 is a block diagram presenting a circuitry construction of the electronic camera. In response to an instruction sent from a main CPU 31, a timing generator (TG) 32 generates a timing signal and supplies the timing signal to each of a driver 33, an AFE (Analog Front End) circuit 34 and an A/D converter circuit 35. The driver 33 generates a driving signal for driving the image sensor for photographing 13 to accumulate charge therein and sweep out (discharge) the accumulated charge therefrom based on the timing signal and supplies the generated driving signal to the image sensor for photographing 13. The AFE (Analog Front End) circuit 34 performs analog processing (such as gain control) on a photoelectrically converted signal (accumulated charge) output from the image sensor for photographing 13. The A/D converter circuit 35 converts the imaging signal after the analog processing into a digital signal.

A timing generator (TG) 36 generates a timing signal in response to an instruction sent from the main CPU 31 and supplies the timing signal to each of a driver 37, AFE (Analog Front End) circuit 39, and an A/D converter circuit 40. The driver 37 generates a driving signal for driving the auxiliary image sensor 19 to accumulate charge therein and sweep out (discharge) the accumulated charge therefrom utilizing the timing signal and supplies the generated driving signal to the auxiliary image sensor 19. The AFE (Analog Front End) circuit 39 performs analog processing (such as gain control) on a photoelectrically converted signal (accumulated charge) output from the auxiliary image sensor 19. The A/D converter circuit 40 converts the imaging signal after the analog processing into a digital signal.

The main CPU 31 inputs therein a signal output from each block, performs a predetermined calculation, and outputs a control signal based on the result of the calculation to each block. The image processing circuit 30 is constituted by, for example, ASIC and performs image processing on digital image signals input from the A/D converter circuits 35 and 40. The image processing performed by the image processing circuit 30 includes image analysis preprocessing, image preprocessing, and image postprocessing.

The image analysis preprocessing is processing for converting the resolution of the image captured by the auxiliary image sensor 19 (or the image sensor for photographing 13) into a resolution necessary for the image analysis processing. Specifically, pixels of the auxiliary image sensor 19 (or image sensor for photographing 13) are grouped into predetermined areas so that the image data can be handled as an image signal for each group unit. This enables one to detect luminance of subject, contrast, or color temperature information for each group (divided area).

The image preprocessing is processing for performing edge enhancement or color temperature adjustment (white balance adjustment) on the captured image (digital image signal) by the image sensor for photographing 13. The image preprocessing is performed based on the results of analysis obtained by the image analysis processing. The image postprocessing is processing for performing format conversion on the digital image signal after the image preprocessing.

A sub-CPU 46 performs image analysis processing on the digital image signal after the image analysis preprocessing by the image processing circuit 30. Specifically, the sub-CPU 46 detects luminance of the subject for each divided area after the grouping and performs well-known calculation of exposure (exposure to light) based on the luminance information to obtain controlled exposure (so-called multi-pattern photometry). In addition, the sub-CPU 46 detects contrast for each divided area and detects the area where a main subject is present based on the contrast (to obtain tracking information for predicting the position of a moving subject). Furthermore, the sub-CPU 46 detects color temperature information for each divided area and determines edge enhancement characteristics and color temperature characteristics based on the color temperature information.

An image compression circuit 44 performs image compression processing in a JPEG format to a predetermined compression ratio on the digital image signal after the image postprocessing by the image processing circuit 30. A display image preparation circuit 42 prepares display data for displaying the photographed image on an external monitor 43 using the digital image signal after the image preprocessing. The external monitor 43 is constituted by, for example, an LCD and reproduces and displays the image corresponding to the display data.

A buffer-memory 41 is used to temporarily store data during or after image preprocessing, image postprocessing, image compression processing, and display data preparation. In a recording medium 45 constituted by, for example, a memory card detachably attached to the electronic camera main body 10 are recorded image data after the image compression processing.

A halfway press down switch 47 and a full press down switch 48 that turn on/off in conjunction with press down operation of a release button (not shown) each output an ON signal or an OFF signal to the main CPU 31.

A focus detecting device 49 detects an adjusted state of focus by the lens 25 in response to an instruction sent from the main CPU 31 and sends a detection signal to the main CPU 31. A lens driving device 50 drives the lens 25 forward/backward in the direction of light axis in response to an instruction from the main CPU 31. A lens information inputting section 51 detects lens information such as an aperture value of the interchangeable lens 24 and sends the detected signal to the main CPU 31.

Figure 3:
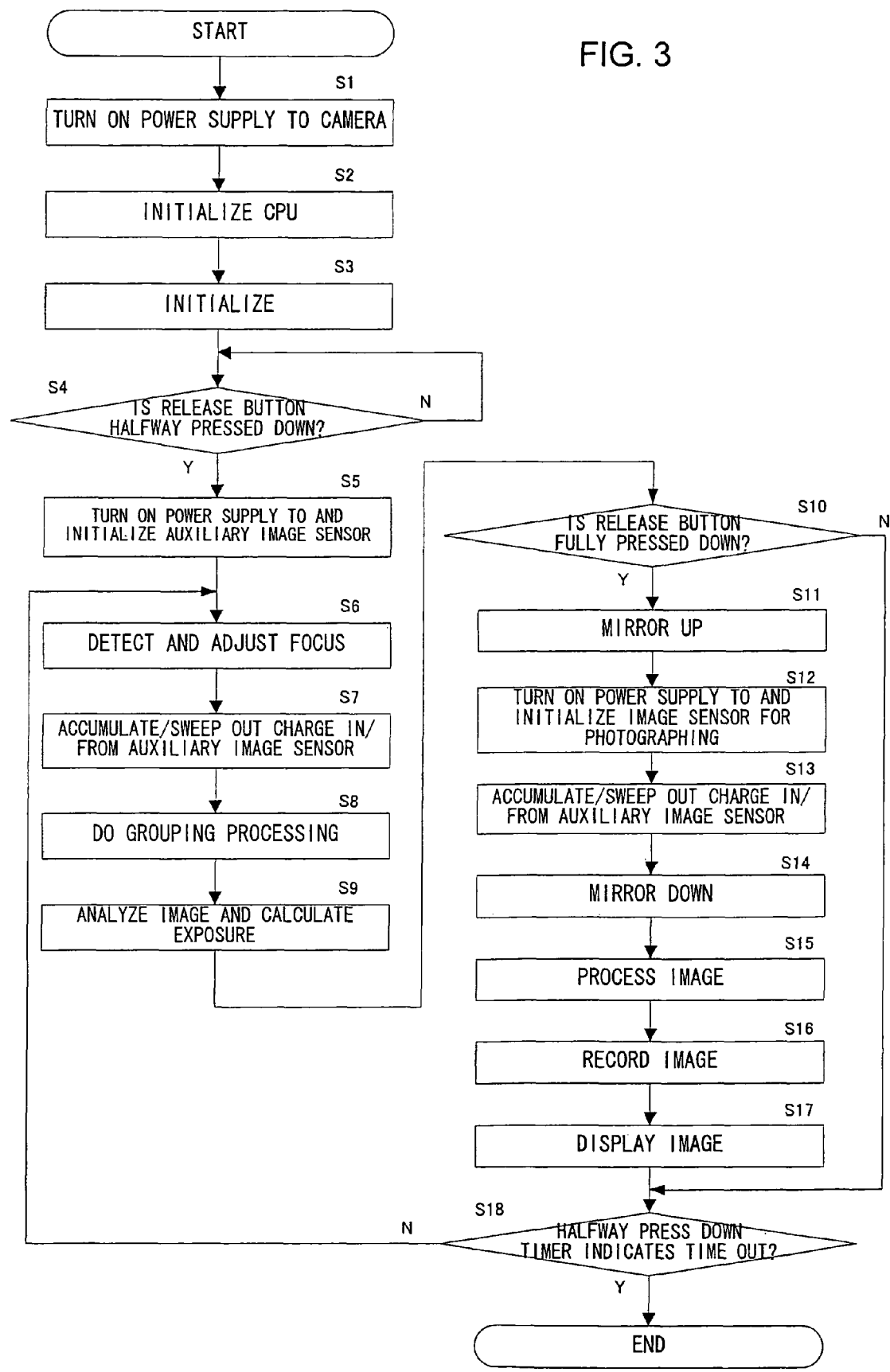
FIG. 3 is a flowchart illustrating the flow of photographing processing performed in a main CPU.

FIG. 3 is a flowchart illustrating the flow of photographing processing performed in the main CPU 31. A program that performs the processing shown in FIG. 3 is stored in a ROM (not shown) in the main CPU 31 and starts up when an ON signal (halfway press down signal) from the halfway press down switch 47 is input into the main CPU 31.

In step S1 in FIG. 3, the main CPU 31 turns the power of the camera ON and the procedure proceeds to step S2. As a result, power is supplied to each block (excepting the image sensor and peripheral circuits thereof) from a power source circuit (not shown). In step S2, the main CPU 31 performs initialization of the main CPU 31, such as setting of ports, and the procedure proceeds to step S3. In step S3, the main CPU 31 performs initialization for default photographing mode, display, and image processing and so on, and the procedure proceeds to step S4.

In step S4, the main CPU 31 judges whether on not the release button has been halfway pressed down. If a halfway press down signal is input from the halfway press down switch 47, the main CPU 31 makes an affirmative judgment in step S4 and the procedure proceeds to step S5, whereas if no halfway press down signal is input from the halfway press down switch 47, the main CPU 31 makes a negative judgment in step S4 and the judgment procedure is repeated.

In step S5, the main CPU 31 turns ON the power supply to the auxiliary image sensor 19 and to peripheral circuits thereof (AFE circuit 39, A/D conversion circuit 40, timing generator 36, and driver 37) and initializes the auxiliary image sensor 19. Then the procedure proceeds to step S6. In step S6, the main CPU 31 sends an instruction to each of the focus detecting device 49 and the lens driving device 50 to cause detection of a state of adjusted focus for the lens 25 and adjustment of the focus of the lens 25. Then, the procedure proceeds to step S7.

In step S7, the main CPU 31 causes the auxiliary image sensor 19 to start imaging (capturing of an image) (start accumulation of charge). The main CPU 31 causes the auxiliary image sensor 19 to stop the imaging after a predetermined time has lapsed and to sweep out the accumulated charge therefrom.

In step S8, the main CPU 31 sends an instruction to the image processing circuit 30 to perform image analysis preprocessing (grouping processing) on the image photographed by the auxiliary image sensor 19 and the procedure proceeds to step S9. In step S9, the main CPU 31 sends an instruction, to the sub-CPU 46 to perform image analysis processing (exposure calculation, contrast detection, and color temperature information detection) on the image after the grouping processing and the procedure proceeds to step S10.

In step S10, the main CPU 31 judges whether or not the release button is fully pressed down. If a full press down signal is input therein from the full press down switch 48, the main CPU 31 makes an affirmative judgment in step S10 and the procedure proceeds to step S11. On the other hand, if no full press down signal is input therein from the full press down switch 48, the main CPU 31 makes a negative judgment in step S10 and the procedure proceeds to step S18.

In step S11, the main CPU 31 starts a photographing sequence. Specifically, the main CPU 31 causes a sequencing device (not shown) to start mirror up and the procedure proceeds to step S12. In step S12, the main CPU 31 turns ON the power supply to the image sensor for photographing 13 and to peripheral circuits thereof (AFE circuit 34, A/D conversion circuit 35, timing generator 32, and driver 33) and initializes the image sensor for photographing 13 and then the procedure proceeds to step S13.

In step S13 the main CPU 31 causes the image sensor for photographing 13 to start imaging (start accumulation of charge). The main CPU 31 controls driving of the shutter 12 and an aperture (not shown) based on the controlled exposure obtained in step S9 and causes the image sensor for photographing 13 to stop the imaging after a predetermined controlled shutter second time has lapsed and to sweep out the accumulated charge therefrom.

In step S14, the main CPU 31 causes the sequencing device (not shown) to start mirror down and the procedure proceeds to step S15. In step S15, the main CPU 31 sends an instruction to the image processing circuit 30 to perform image processing (image preprocessing and image postprocessing) on the image captured by the image sensor 13 and the procedure proceeds to step S16.

In step S16, the main CPU 31 sends an instruction to the image compression circuit 44 to perform image compression processing on the digital image signal after the image postprocessing and to record the compressed image data in the recording medium 45 and the procedure proceeds to step S17.

In step S17, the main CPU 31 sends an instruction to the display image preparation circuit 42 to prepare display data using the digital image signal after the image preprocessing and the procedure proceeds to step S18. As a result, the photographed image is reproduced and displayed on the external monitor 43 and a series of photographing operations is ended.

In step S18, the main CPU 31 judges whether or not a halfway press down timer indicates time out. The main CPU 31 makes an affirmative judgment if a state in which no halfway press down signal has been input from the halfway press down switch 47 continues for a predetermined time, turns off the power of camera, and ends the procedure illustrated, in FIG. 3. On the other hand, the main CPU 31 makes a negative judgment in step S18, if a halfway press down signal is being input from the halfway press down switch 47 or if the state in which no halfway press down signal has been input continues for a time less than the predetermined time. Then, the process returns to step S36 and the procedure described above is repeated.

Figure 4:
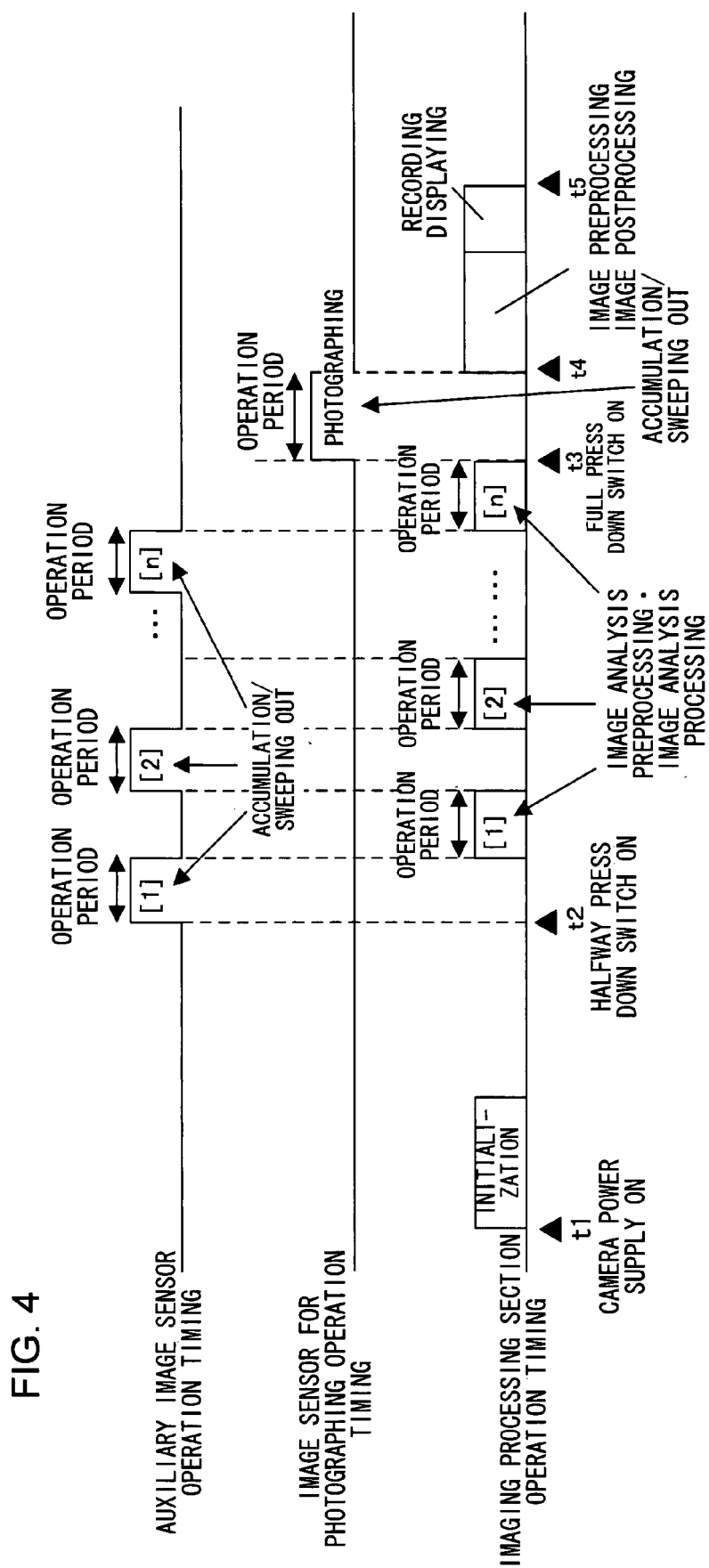
FIG. 4 is a diagram illustrating the operation timings of an auxiliary image sensor, an image sensor for photography, and an image processing section in photographing processing.

FIG. 4 is a timing chart illustrating operation timing of each of the auxiliary image sensor 19, the image sensor for photography 13, and the image processing section (image processing circuit 30 and sub-CPU 46) in the photographing processing by the electronic camera.

At timing t1 in FIG. 4, the camera power supply is turned ON and initialization of the main CPU 31 and each block is performed. When the halfway press down switch 47 is turned ON at timing t2, the auxiliary image sensor 19 accumulates therein charge and sweeps out the accumulated charge therefrom (imaging [1]). In FIG. 4, operation period of the auxiliary image sensor 19 is the sum of charge accumulation time and a time required for charge sweeping out.

When the imaging [1] is completed, image analysis preprocessing is performed by the image processing circuit 30 and subsequently, image analysis processing is performed by the sub-CPU 46 (processing [1]). In FIG. 4, the operation period of the image processing section is the sum of time required for image analysis preprocessing and time required for image analysis processing.

When the processing [1] is completed, the auxiliary image-sensor 19 performs next charge accumulation and sweeps out the accumulated charge therefrom (imaging [2]). When the imaging [2] is completed, the image processing circuit 30 performs next image analysis preprocessing and the sub-CPU 46 performs next image analysis processing (processing [2]). As described above, the electronic camera is configured to repeat imaging (capturing of an image) by the auxiliary image sensor 19 and the processing by the image processing section (image processing circuit 30 and the sub-CPU 46) as far as the halfway press down switch 47 continues to be ON.

If the full press down switch 48 is turned ON at timing t3 after the auxiliary image sensor 19 has started n-th imaging [n], the image processing section (image processing circuit 30 and sub-CPU 46) ends the n-th processing (processing [n]), and then the image sensor for photographing 13 accumulates charge and sweeps out the accumulated charge therefrom ("photographing"). In FIG. 4, the operation period of the image sensor for photographing 13 is the sum of charge accumulation time and time required for charge sweeping out.

It is to be noted that if the full press down switch 48 is turned ON at timing when the auxiliary image sensor 19 starts the second or later imaging, the imaging by the auxiliary image sensor 19 and the processing by the image processing section (image processing circuit 30 and sub-CPU 46) may be interrupted so that the image sensor for photographing 13 can immediately accumulate charge. In other words, if at least one image analysis preprocessing/image analysis processing using the image captured by the auxiliary image sensor 19 is completed, then "photographing" may be started at a point in time when the full press down switch 48 is turned ON.

When "photographing" is completed (timing t4), the image processing circuit 30 performs image preprocessing and image postprocessing and subsequently recording of the processed image into the recording medium 45 and displaying of the image on the external monitor 43. After the recording/displaying is completed (timing t5), a series of photographing operations is completed.

(When Photographic Auxiliary Light is Used)

Figure 5:
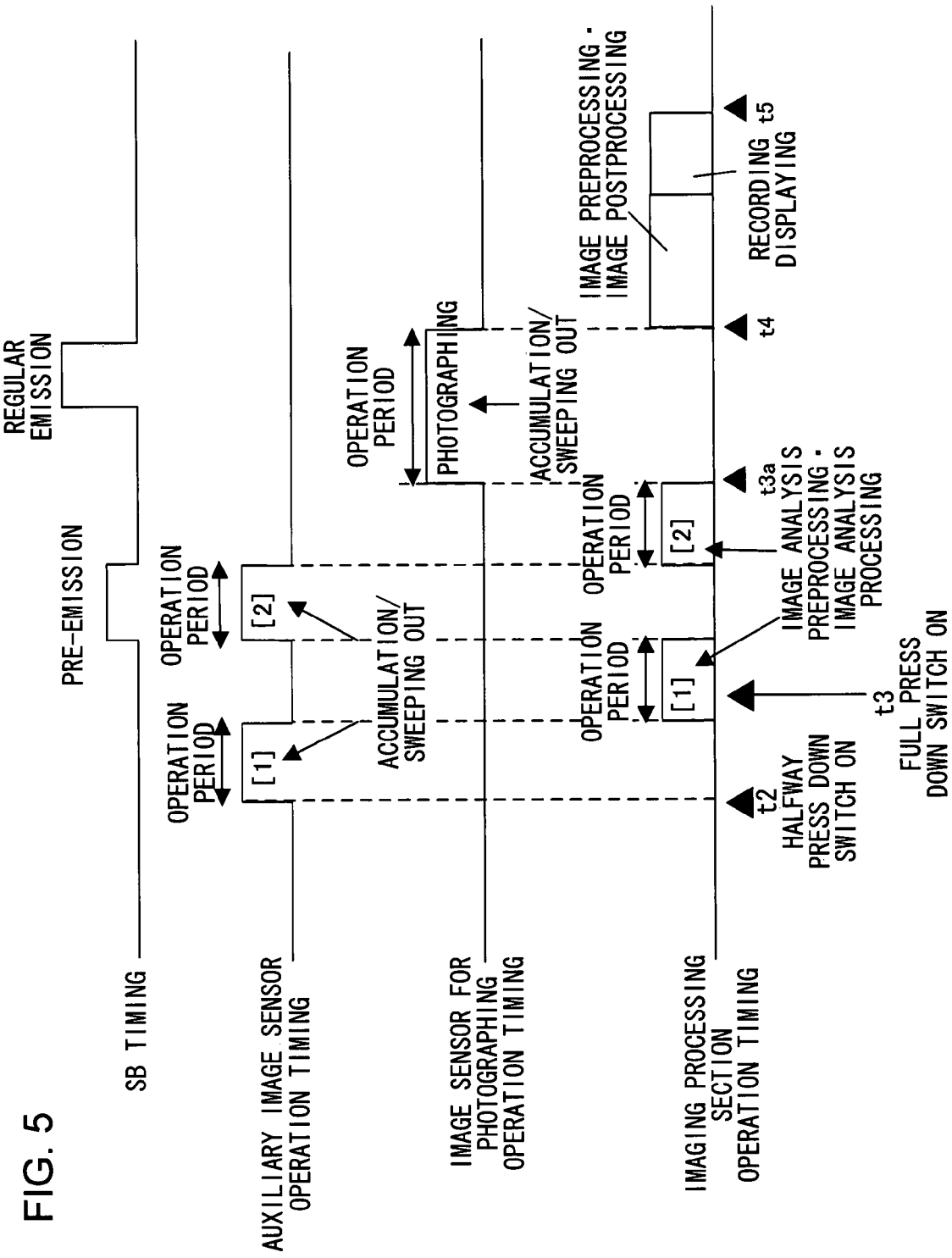
FIG. 5 is a diagram illustrating the operation timing in photographing processing in which a flash unit is flashed.

FIG. 5 is a timing chart illustrating operation timing of emission timing (SB timing) of a flash unit, operation timing of the auxiliary image sensor 19, operation timing of the image sensor for photographing 13, and operation timing of image processing section (image processing circuit 30 and sub-CPU 46) in photographing processing in the case where a flash unit (not shown) is caused to flash.

If the halfway press down switch 47 is turned ON at timing t2 in FIG. 5, the auxiliary image sensor 19 accumulates charge and sweeps out the accumulated charge therefrom (imaging [1]). After the imaging [1] is completed, the image processing circuit 30 performs image analysis preprocessing and subsequently the sub-CPU 46 performs image analysis processing (processing [1]).

If the full press down switch 48 is turned ON at timing t3 when the first imaging by the auxiliary image sensor 19 is started or thereafter, then after the first processing (processing [1]) by the image processing section (image processing circuit 30 and sub-CPU 46) is completed, the auxiliary image sensor 19 performs next charge accumulation and sweeps out the accumulated charge therefrom (imaging [2]). Upon the charge accumulation in the imaging [2], the main CPU 31 sends a preflash instruction to the flash unit to cause the flash unit to preflash at a predetermined light quantity.

If the imaging [2] is completed, the image processing circuit 30 performs image analysis preprocessing and subsequently the sub-CPU 46 performs image analysis processing (processing [2]). In this image analysis processing, light quantity of regular (main) flash is also calculated. At timing t3a after completion of the processing [2], the image sensor for photographing 13 performs charge accumulation and sweeps out the accumulated charge therefrom ("photographing"). Upon the charge accumulation in "photographing", the main CPU 31 sends an instruction for regular flash to the flash unit to perform regular flash at the calculated light quantity.

When the "photographing" is completed (timing t4), the image processing circuit 30 performs image preprocessing and image postprocessing and subsequently recording of the obtained image into the recording medium 45 and displaying of the image on the external monitor 43. When the recording/displaying is completed (timing t5), a series of operations is completed.

According to the embodiments described above, the following advantageous effects can be obtained.

(1) A single image processing section (unit) (image processing circuit 30 and sub-CPU 46) processes in time sharing the processing on the image captured by the image sensor for photographing 13 (image preprocessing and image postprocessing) and the processing on the image captured by the auxiliary image sensor 19 (image analysis preprocessing and image analysis processing), so that downsizing and power saving of the camera can be achieved more efficiently as compared with the case where each of two lines of image sensors is provided with an image processing section.

(2) If the timing at which the full press down switch 48 is turned ON is before the second imaging by the auxiliary image sensor 19 is started and after the halfway press down switch 47 is turned ON (timing t3 in FIG. 5), the imaging by the auxiliary image sensor 19 and the processing by the image processing circuit 30 (image processing circuit 30 and sub-CPU 46) are not interrupted but the image sensor for photography 13 is configured to start "photographing" only after the imaging in operation and the processing on the obtained image are completed. As a result, the "photographing" can be started after the image analysis preprocessing/image analysis processing is completed without fail.

(3) Further, when photographic auxiliary light is used, the auxiliary image sensor 19 is caused to capture an image with the flash unit being in a preflashed state and the image sensor for photographing 13 starts "photographing" after the image processing section (image processing circuit 30 and sub-CPU 46) has completed the processing on the image (timing t3a). As a result, the "photographing" can be started after the light quantity for regular flash is calculated by image analysis processing using light preflashed by the flash unit and reflected by a subject.

(When in Continuous Shooting)

Figure 6:
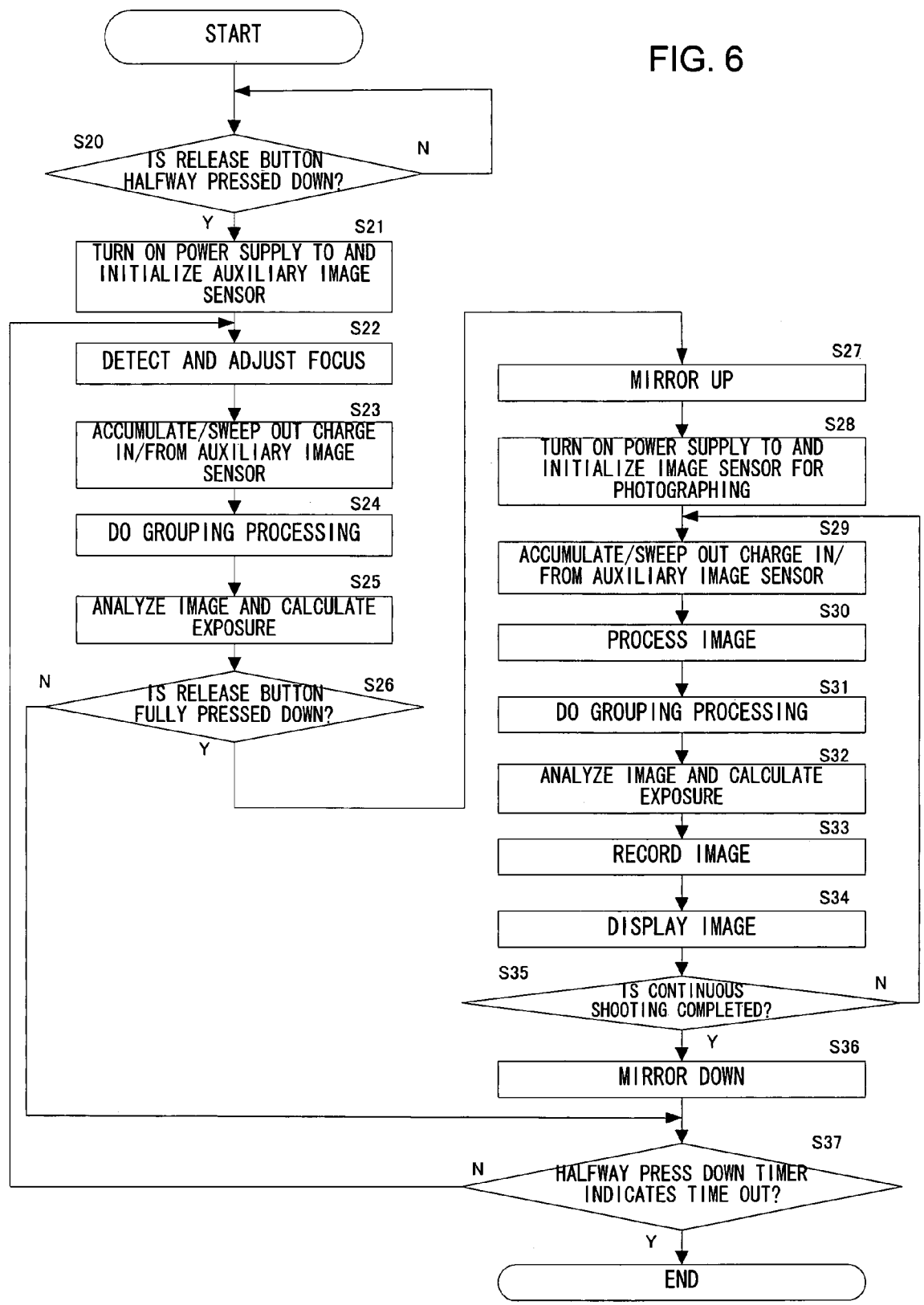
FIG. 6 is a flowchart illustrating the flow of continuous shooting processing performed in a main CPU.

The electronic camera described above performs continuous shooting as follows. FIG. 6 is a flowchart illustrating the flow of continuous shooting processing performed in the main CPU 31. The program that performs the procedure of FIG. 6 starts up when the electronic camera is set in a continuous shooting mode. The procedure from step S20 (judgment of halfway press down of release button) to step S29 (charge accumulation/sweep out by image sensor for photographing) is similar to the procedure from step S4 (judgment of halfway press down of a release button) to step S13 (charge accumulation/sweep out by image sensor for photographing) and explanation thereof is omitted.

In step S30 in FIG. 6, the main CPU 31 sends an instruction to the image processing circuit 30 to perform image processing (image preprocessing and image postprocessing) on the image 10 captured by the image sensor for photographing 13 and the procedure proceeds to step S31.

In step S31, the main CPU 31 sends an instruction to the image processing circuit 30 to perform image analysis 15, preprocessing (grouping processing) on the image captured by the image sensor for photographing 13 and the procedure proceeds to step S32. In step S32, the main CPU 31 sends an instruction to the sub-CPU 46 to perform image analysis processing (exposure calculation, contrast detection, color temperature information detection) oh the image after the grouping processing and the procedure proceeds to step S33.

In step S33, the main CPU 31 sends an instruction to the image compression circuit 44 to perform image compression processing on the digital image signal after the image postprocessing and record the compressed image data in the recording medium 45. Then, the procedure proceeds to step S34.

In step S34, the main CPU 31 sends an instruction to the display image preparation circuit 42 to prepare display data using the digital image signal after the image preprocessing and the procedure proceeds to step S35. As a result, the photographed image is reproduced and displayed on the external monitor 43, so that a photographing operation for one frame is completed.

In step S35, the main CPU 31 judges whether or not the continuous shooting is completed. If the continuous shooting is completed (for example, the ON signal from the full press down switch 48 is released), the main CPU 31 makes an affirmative judgment in S35 and the procedure proceeds to step S36, whereas if the continuous shooting is continued (for example, the ON signal from the full press down switch 48 is continued), the main CPU 31 makes a negative judgment in step S35 and the procedure returns to step S29.

The processing in step S36 (mirror down) is similar to the processing in step S14 (mirror down) in FIG. 3, so that explanation thereon is omitted. In step S37, the main CPU 31 judges whether or not a halfway press down timer indicates time out. The main CPU 31 makes an affirmative judgment if a state in which no halfway press down signal is being input from the halfway press down switch 47 continues for a predetermined time, and ends the procedure in FIG. 6. On the other hand, the main CPU 31 makes a negative judgment in step S18, if a halfway press down signal has been input from the halfway press down switch 47 or if the state in which no halfway press down signal has been input continues for a time less than the predetermined time. Then, the process returns to step S22 and the procedure described above is repeated.

Figure 7:
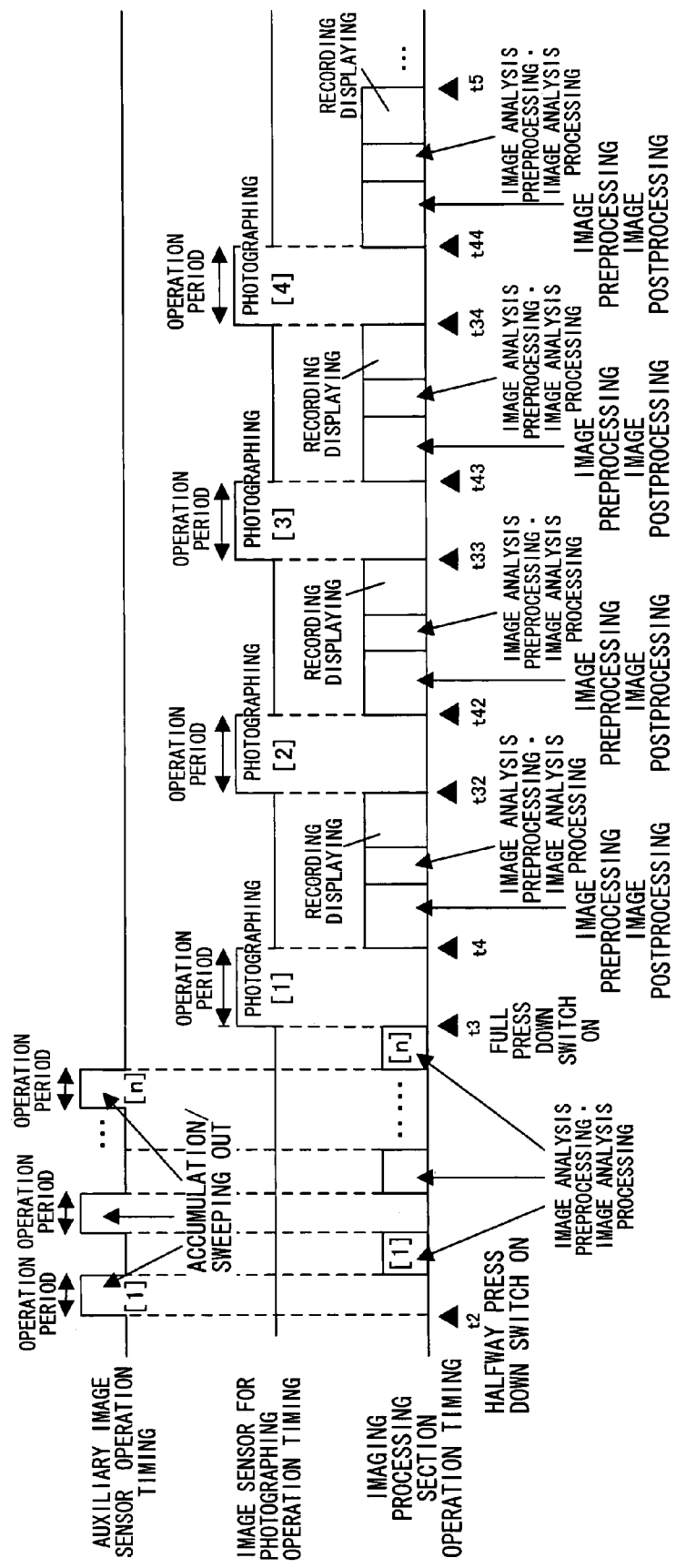
FIG. 7 is a diagram illustrating the operation timings of an auxiliary image sensor, an image sensor for photography, and an image processing section in continuous shooting processing.

FIG. 7 is a timing chart illustrating operation timing of each of the auxiliary image sensor 19, the image sensor for photography 13, and the image processing section (image processing circuit 30 and sub-CPU 46) in continuous shooting processing by the electronic camera. In FIG. 7, the operation timing before timing t3 is similar to the case shown in FIG. 4, so that explanation thereon is omitted.

If the full press down switch 48 is turned ON at timing t3 after the auxiliary image sensor 19 has started n-th imaging [n], the image processing section (image processing circuit 30 and sub-CPU 46) ends the n-th processing (processing [n]), and then the image sensor for photographing 13 accumulates charge and sweeps out the accumulated charge therefrom (photographing [1]).

When the photographing [1] is completed (timing t4), the image processing circuit 30 performs image preprocessing, image postprocessing, image analysis preprocessing (grouping processing), and image analysis processing, and subsequently recording of the processed image into the recording medium 45 and displaying of the image on the external monitor 43. When the recording/displaying processing is completed (timing t32), the image sensor for photographing 13 performs charge accumulation for a second frame and sweeps out the accumulated charge therefrom (photographing [2]).

When the photographing [2] is completed (timing t42), the image processing circuit 30 performs image preprocessing, image post processing, image analysis preprocessing (grouping processing), and image analysis processing, and subsequently recording of the processed image into the recording medium 45 and displaying of the image on the external monitor 43. When the recording/displaying processing is completed (timing t33), the image sensor for photographing 13 performs charge accumulation for a third frame and sweeps out the accumulated charge therefrom (photographing [3]).

The camera is configured to subsequently repeat the photographing by the image sensor for photographing 13 and the processing by the image processing section (image processing circuit 30 and the sub-CPU 46) as far as the full press down switch 48 is continued to be ON.

In the continuous shooting described above, the image analysis preprocessing and image analysis processing are performed on the image captured by the image sensor for photographing 13 after the full press down switch 48 is turned ON, so that the power supply to the auxiliary image sensor 19 and peripheral circuit thereof (the AFE circuit 39, the A/D conversion circuit 40, the timing generator 36, and the driver 37) can be turned OFF after the full press down switch is turned ON, thus reducing the power consumption of the camera.

VARIATION EXAMPLE 1

While in the above explanation, peripheral circuits for driving the image sensor, etc. (AFE circuit, A/D conversion circuit, timing generator, driver) are arranged in each of the auxiliary image sensor 19 and the image sensor for photographing 13 correspondingly, the camera may be configured such that the peripheral circuitry is shared between the both image sensors. In this case, one line of circuitries can be omitted so that the camera can be further downsized.

VARIATION EXAMPLE 2

An example has been explained in which the image sensor for photographing 13 and the auxiliary image sensor 19 are each provided with a primary color filter, so that each image sensor can output imaging signal having color information. The color filter, however, is not limited to a primary color system but a complementary color system may also be used.

VARIATION EXAMPLE 3

Figure 8:
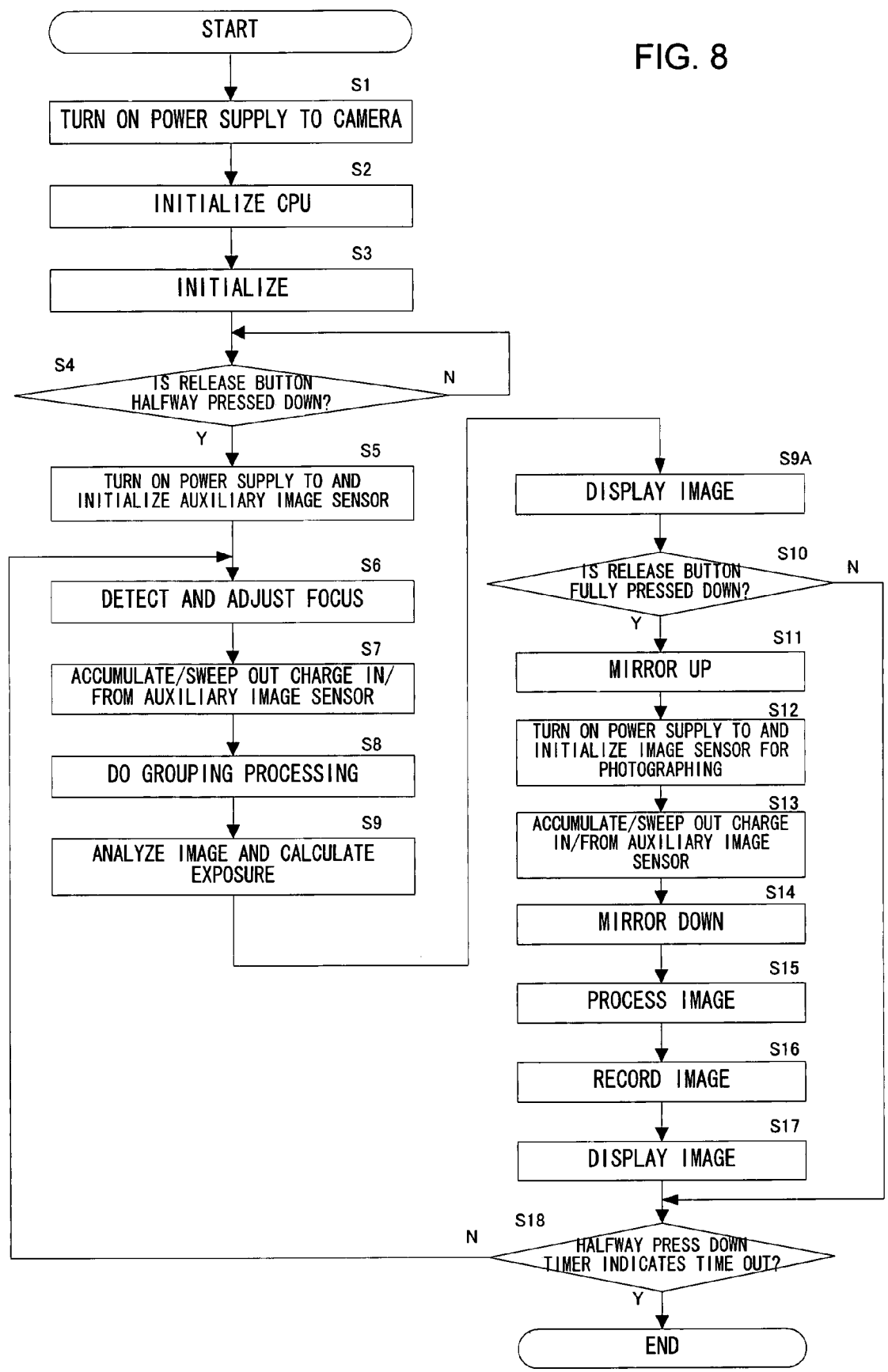
FIG. 8 is a flowchart illustrating the flow of photographing processing according to a third variation of embodiment.

The camera may be configured such that before the release button is fully pressed down, the image captured by the auxiliary image sensor 19 may be reproduced and displayed on the external monitor 43. FIG. 8 is a flowchart explaining the flow of photographing processing performed by the main CPU 31 according to Variation Example 3. The procedure illustrated in FIG. 8 is performed in place of the procedure illustrated in FIG. 3. FIG. 8 and FIG. 3 differ one from another in that step S9A is inserted between steps S9 and S10 in FIG. 8 and explanation is focused on this difference.

In step S9A in FIG. 8, the main CPU 31 sends an instruction to the display image preparation circuit 42 to prepare display data from the image signal output from the auxiliary image sensor 19 and digitized by the A/D conversion circuit 40. Then, the procedure proceeds to step S10. As a result, a monitor image (so-called through image) can be reproduced and displayed even before the release button is fully pressed down and the image sensor for photographing 13 is in an inactive state.

If the main CPU 31 judges that there has occurred no full press down of the release button (makes a negative judgment in step S10), the procedure returns to step S6 through step S18. In this case, the electronic camera repeats the imaging by the auxiliary image sensor 19, the processing by the image processing section (image processing circuit 30 and the sub-CPU 46), and the displaying on the external monitor 43 at a predetermined interval. If the camera is configured such that the repetition occurs, for example, 30 times per second (30 frames/second), the user can confirm the motion of the subject in real-time from the reproduced image displayed on the external monitor 43.

It is to be noted that if the procedure explained in Variation Example 3 is to be applied to continuous shooting, the processing corresponding to step S9A described above may be inserted between step S25 and step S26 in the flowchart in FIG. 6.

While in the above explanation has been made on an example of single-lens reflex type electronic camera, the present invention may be applied to a non-single-lens reflex type electronic camera. In this case, a beam splitter or a half mirror is used to divide the beam from the subject, allowing a plurality of image sensors to form an image of the subject.

In addition, the present invention may be applied to a film camera.

While in the above, explanation has been made on various embodiments and variation examples, the present invention should not be considered to be limited thereto and other embodiments conceivable within the technical concept of the present invention are also encompassed by the scope of the present invention.

The content of the following base application on which priority is claimed in the present application is incorporated herein by reference:

Japanese Patent Application No. 2005-139434 (filed May 12, 2005).

The invention claimed is:

1. A camera comprising:
 a first image sensor that captures a first image of a subject and outputs a first imaging signal in response to pressing a shutter release operation member fully down;
 a second image sensor that is separately arranged from the first image sensor, captures a second image of the subject and outputs a second imaging signal in response to pressing the shutter release operation member halfway down;
 a driving unit that drives the first image sensor and the second image sensor;
 a single processing unit that separately processes the first imaging signal and the second imaging signal at different times; and
 a control unit that controls the driving unit and the single processing unit, wherein:
 the first imaging signal is an imaging signal for recording;
 the second imaging signal is an imaging signal for analyzing a photographic field;
 the single processing unit performs an image processing of the first imaging signal output from the first image sensor by using results of an analysis of the second imaging signal;
 the second image sensor captures a plurality of second images of the subject and outputs a plurality of second imaging signals in response to pressing the shutter release operation member halfway down; and
 the control unit controls the driving unit so that the second image sensor interrupts capturing of one second image before completing the capturing of the one second image after starting the capturing of the one second image and the first image sensor starts capturing the first image, in response to the shutter release operation member being fully pressed down on a way of the capturing of the second image by the second image sensor, if at least an initial second image has been already captured and the single processing unit has already processed the second imaging signal for the initial second image.

2. The camera according to claim 1, wherein:
 the control unit controls the driving unit and the single processing unit so that the second image sensor starts capturing an image,
 an analysis of the photographic field is performed by using the second imaging signal output from the second image sensor,
 an exposure is controlled based on information obtained by the analysis of the photographic field to enable the first image sensor to start capturing an image, and
 the image processing of the first imaging signal is performed based on information obtained by the analysis of the photographic field.

3. The camera according to claim 1, wherein:
 the second imaging signal is used in an analysis for capturing an initial first image by the first image sensor,
 after the initial first image is captured, the first imaging signal is used instead of the second imaging signal in an analysis for capturing a subsequent first image by the first image sensor, in continuous shooting; and
 the control unit controls the driving unit to enable the first image sensor to start capturing the subsequent first image when the first imaging signal is output from the first image sensor during continuous shooting.

4. The camera according to claim 3, wherein:
 in capturing the subsequent first image by the first image sensor, the control unit controls the driving unit and the single processing unit so that:
 (1) the analysis of the photographic field is performed by using the first imaging signal output from the first image sensor,
 (2) the first image sensor starts capturing the subsequent first image at a controlled exposure based on information obtained from the analysis of the photographic field, and
 (3) the image processing of the first imaging signal is performed based on the information obtained from the analysis of the photographic field.

5. The camera according to claim 1, wherein:
 the control unit controls the driving unit so that the first image sensor starts capturing the first image if the output and the analysis of the second imaging signal for at least the initial second image from the second image sensor has been completed.

6. The camera according to claim 1, wherein:
the processing of the second imaging signal includes one of an exposure calculation processing, a main subject detection processing, and a color temperature information detection processing; and
the image processing of the first imaging signal includes one of an edge enhancement processing and a color temperature adjustment processing.

7. The camera according to claim 1, wherein:
the image processing of the first imaging signal and the processing of the second imaging signal by the single processing unit do not overlap with each other.

8. The camera according to claim 1, wherein:
the single processing unit arranges a time period when the first imaging signal and the second imaging signal both are not processed, between the processing of the first imaging signal and the processing of the second imaging signal.

9. A method for controlling a camera, comprising:
outputting a first imaging signal by capturing a first image of a subject via a first image sensor;
outputting a second imaging signal by capturing a second image of the subject via a second image sensor that is separately arranged from the first image sensor;
processing the second imaging signal via a single processing unit during a first time period; and
processing the first imaging signal via the single processing unit by using results of the processing of the second imaging signal during a second time period that is different from the first time period, wherein:
the processing of the second imaging signal is performed in response to pressing a shutter release operation member halfway down;
the second image sensor captures a plurality of second images of the subject and outputs a plurality of second imaging signals in response to pressing the shutter release operation member halfway down; and
the second image sensor is controlled to interrupt capturing of one second image before completing the capturing of the one second image after starting the capturing of the one second image and the capturing of the first image by the first imaging sensor is started, in response to pressing the shutter release operation member fully down on a way of the capturing of the one second image by the second image sensor, if the second imaging signal of at least an initial second image captured by the second imaging sensor has been already output from the second imaging sensor and the processing of the second imaging signal of the initial second image has been already completed.

10. The method for controlling a camera according to claim 9, wherein:
an analysis processing of the second imaging signal is performed by the single processing unit during the first time period; and
an image processing of the first imaging signal is performed by the single processing unit during the second time period by using results of the analysis processing with the second imaging signal.

11. The camera according to claim 1, wherein:
the control unit controls a photographing sequence and is configured with a first semiconductor element; and
the single processing unit is configured with a second semiconductor element that is different from the first semiconductor element.

12. The camera according to claim 1, wherein:
the control unit controls the single image processing unit so that the single image processing unit interrupts the processing of the second imaging signal of the one second image when the processing of the second imaging signal of the one second image has already been started and the first image sensor starts capturing the first image immediately in response to the shutter release operation member being fully pressed down, if at least the initial second image has already been captured and the single image processing unit has already processed the second imaging signal for the initial second image.

13. The method for controlling a camera according to claim 9, wherein:
the single image processing unit is controlled to interrupt the processing of the second imaging signal of the one second image when the processing of the second imaging signal of the one of the second image has already been started and the first image sensor is controlled to start capturing the first image immediately in response to pressing the shutter release operation member fully down, if at least the initial second image has already been captured and the single image processing unit has already processed the second imaging signal for the initial second image.

* * * * *